(12) United States Patent  (10) Patent No.: US 8,540,052 B1
Brown  (45) Date of Patent: Sep. 24, 2013

(54) HUNTING STAND

(76) Inventor: Devin Brown, Youngsville, LA (US)

(*) Notice: Subject to any disclaimer, the term of this patent is extended or adjusted under 35 U.S.C. 154(b) by 119 days.

(21) Appl. No.: 13/245,991

(22) Filed: Sep. 27, 2011

(51) Int. Cl.
A01M 31/00 (2006.01)

(52) U.S. Cl.
USPC .......................................... 182/115; 182/187

(58) Field of Classification Search
USPC ......................................... 182/115, 116, 187
See application file for complete search history.

(56) References Cited

U.S. PATENT DOCUMENTS

| | | | | |
|---|---|---|---|---|
| 1,903,267 | A * | 3/1933 | Roberts | 248/417 |
| 2,498,004 | A * | 2/1950 | Pullen | 297/344.24 |
| 6,725,972 | B1 * | 4/2004 | Krier et al. | 182/187 |
| 7,320,382 | B2 * | 1/2008 | Savoie et al. | 182/127 |
| 2007/0199769 | A1 * | 8/2007 | Chesness et al. | 182/115 |
| 2009/0277721 | A1 * | 11/2009 | Weir | 182/115 |
| 2010/0300806 | A1 * | 12/2010 | Ash | 182/113 |

* cited by examiner

Primary Examiner — Alvin Chin Shue
(74) Attorney, Agent, or Firm — Gulf Coast Intellectual Property Group

(57) ABSTRACT

A hunting stand operable to provide an elevated position for a hunter wherein the platform of the stand includes a chair that is movably mounted on the platform. The chair is operably coupled to a base support member that is movably mounted within an annular channel that is integrally formed with the platform. The hunting stand further includes a frame having a plurality of longitudinal support members and horizontal support members. The platform further includes a centrally located hole that is operable to facilitate the positioning of the hunting stand such that the platform is surroundably mounted a tree. A plurality of apertures are journaled through the upper surface of the platform adjacent to the channel and function to receive a locking pin that functions to releasably secure the base support member in a position along the channel. The platform includes a railing mounted adjacent the perimeter of the platform.

15 Claims, 2 Drawing Sheets

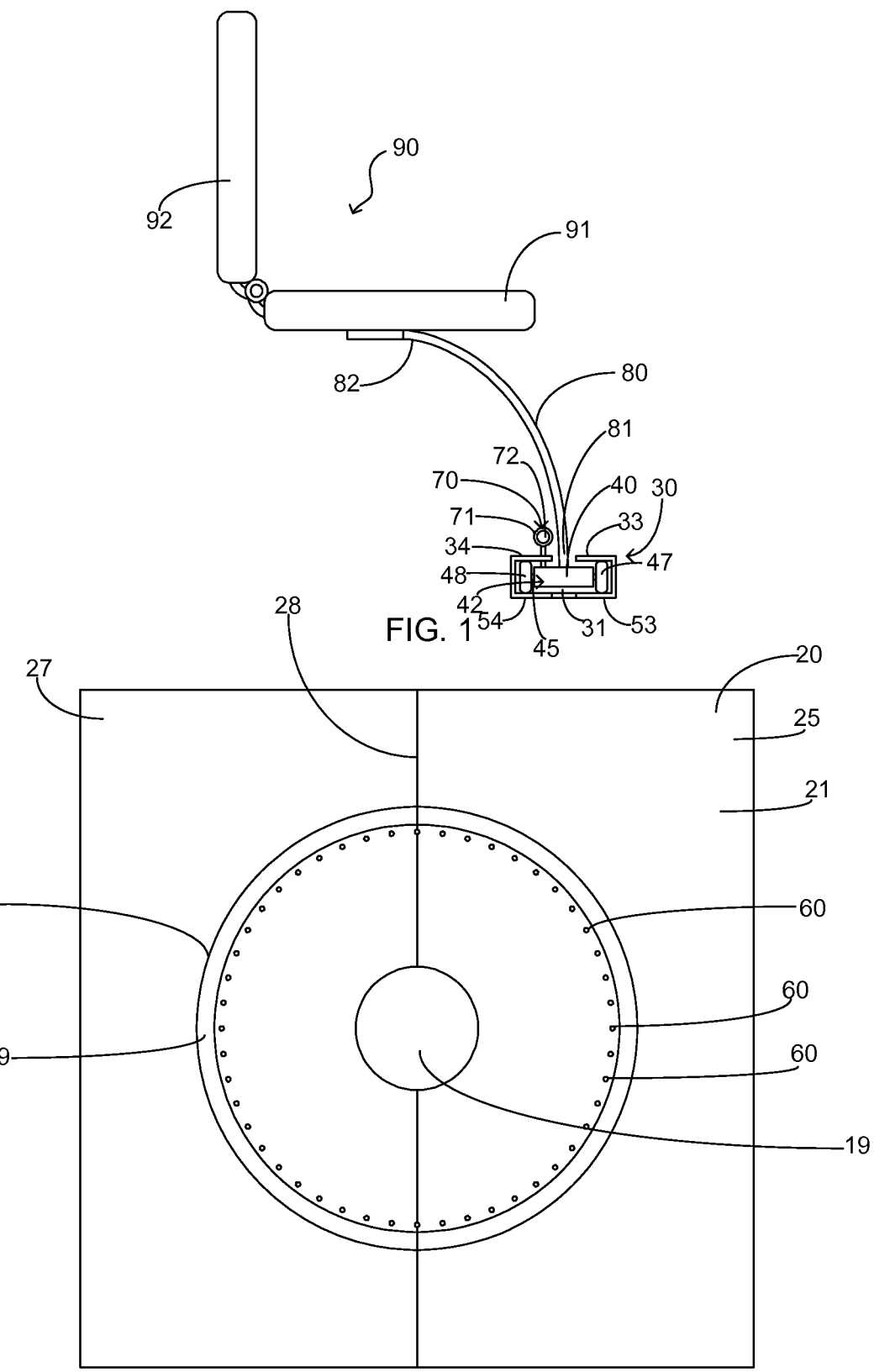

HUNTING STAND

FIELD OF THE INVENTION

The present invention relates to a hunting stand, more specifically but not by way of limitation, a portable hunting stand that is operable to be constructed circumferentially around a tree wherein the hunting stand further includes a platform providing a chair for a hunter that is movable around a three hundred and sixty degree radius.

BACKGROUND

Millions of individuals routinely engage in outdoor activities such as camping, hiking or hunting. Engaging in these sports typically involves the use of specialized equipment. Those that participate in hunting will utilize specialized firearms, feeding equipment and other paraphernalia to assist in the accomplishment of their objective. Many different types of hunting tactics are utilized dependent upon the intended target. For example, pheasant hunters will typically utilize camouflage gear and dogs while traversing a field or area where pheasants are known to inhabit. The hunters will traverse the area such that they are in general alignment and the dogs are utilized to flush the pheasants from the dwelling providing the hunter an opportunity to shoot a pheasant as it try to escape the dog.

Another type of hunting that is very popular is deer hunting. Deer hunting can be accomplished utilizing various techniques but one of the most popular techniques is for the hunter to position themselves in one location where deer are know to either inhabit or traverse on a regular basis. Deer hunters will often utilize feeding techniques or other methods to attract deer will the hunter is positioned nearby. It is routine for a deer hunter to position themselves in an elevated position so as to increase their ability to see and potentially shoot a deer. Deer hunters will utilize natural elevated positions or will also utilize trees or artificial stands to obtain an elevated position in a desired area. A common tool utilized to obtain an elevated position is known as a deer stand.

Conventional deer stands range from devices that operably coupled to a tree to an independent platform. These conventional devices typically are lightweight and provide a very small platform for the hunter to position themselves in a particular direction in order to gain an advantage and a potential shooting angle at a deer or other intended target. One problem with conventional devices is that they provide limited or no maneuverability. Typical platforms for a conventional deer stand provide small platforms or horizontal support structures that limit the movement of the hunter and provide restricted shooting angles towards a target. The hunter must position themselves in such a manner that limits the ability to shoot at an intended target in a full three hundred and sixty degree radius. Conventional deer stands provide a hunter at most a one hundred an eighty-degree shooting radius. This can be a problem when the intended target appears behind where the hunter is facing.

Another issue with conventional hunting stands is the limitation on the amount of hunting area that can be surveyed once superposed the hunting stand. As most hunting stands provide limited maneuverability for a hunter, the hunter does not have visibility to areas behind them once they are in position. This limits the ability for the hunter to monitor a full three hundred and sixty degree perimeter around their position so as to maximize their elevated position and potentially shoot an intended target.

Accordingly, there is a need for a hunting stand that is portable and provides a structure that facilities an elevated position wherein the position provided to the hunter further provides a manner in which the hunter can alter their position such that the hunter will have three hundred and sixty degree visibility from the hunting stand.

SUMMARY OF THE INVENTION

It is the object of the present invention to provide a hunting stand that facilitates a three hundred and sixty degree view for the hunter.

Another object of the present invention is to provide a hunting stand that include a platform having a movable support structure for the hunter to superpose themselves to survey an area.

Yet another object of the present invention is to provide a hunting stand wherein the movable support structure is a chair or the like and the chair is movable mounted such that the chair can be positioned at any point along the circumference of the platform of the hunting stand.

Still another object of the present invention is to provide a hunting stand that includes a chair that is movably mounted to provide a hunter a movable chair that is further configured to be locked into any position along the circumference of the platform.

An additional object of the present invention is to provide a hunting stand that includes a platform that is constructed from a first section and a second section so as to facilitate easier transport thereof.

A further object of the present invention is to provide a hunting stand that includes an aperture in the platform to facilitate the platform being circumferentially mounted around a tree.

Another object of the present invention is to provide a hunting stand that includes a railing that supports a concealment skirt so as to substantially conceal a hunter superposed the chair on the platform.

Still a further object of the present invention is to provide a hunting stand having a platform with a movable chair wherein the chair is moved either manually or with mechanical assistance.

Another object of the present invention is to provide a hunting stand that is lightweight and portable so as to facilitate easy transport thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a side view of the chair of the present invention; and

FIG. 2 is a top view of the platform of the present invention; and

DETAILED DESCRIPTION

Figure 3:
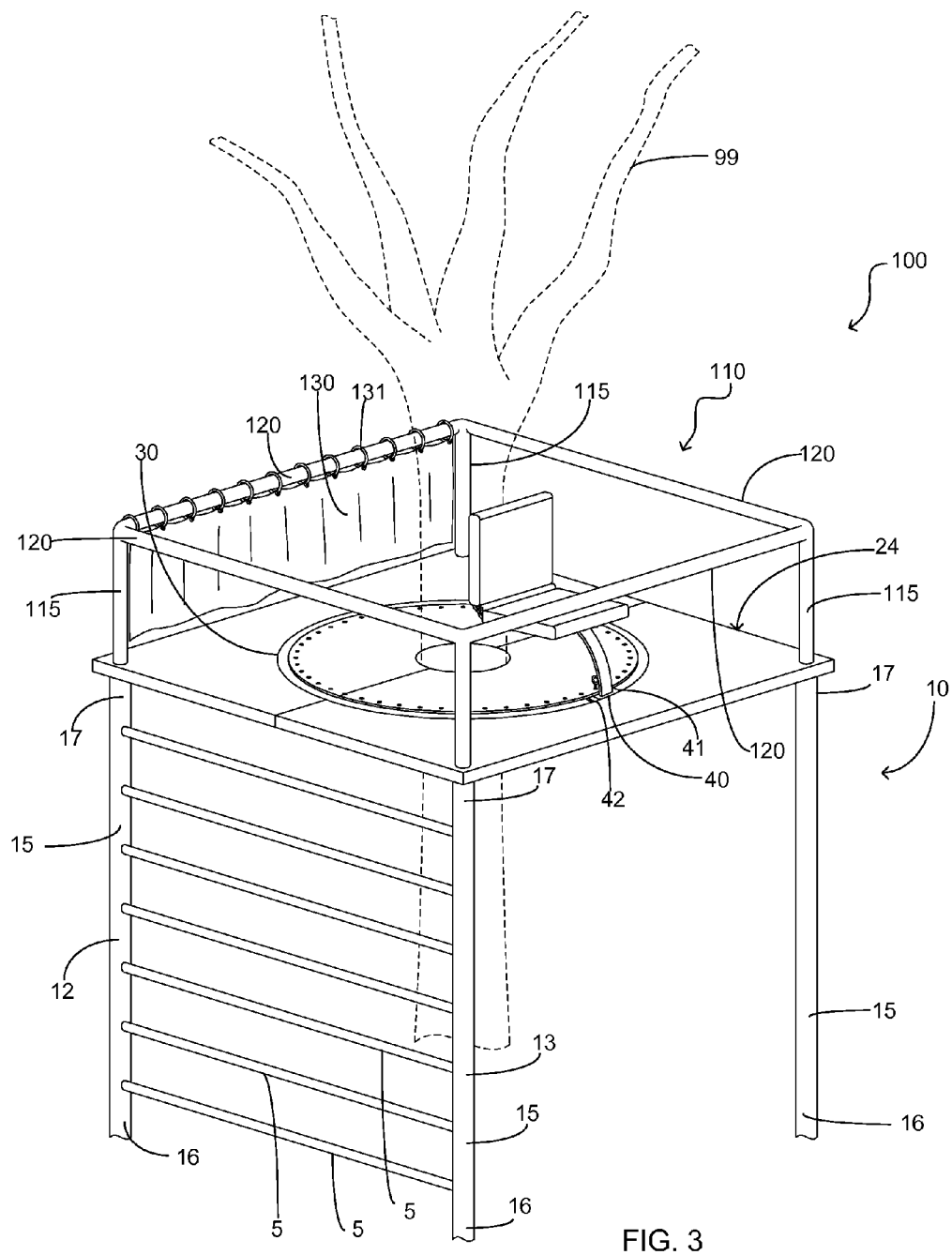
FIG. 3 is a perspective view of the present invention.

Referring now to the drawings submitted herewith, wherein various elements depicted therein are not necessarily drawn to scale and wherein through the views and figures like elements are referenced with identical reference numerals, there is illustrated a hunting stand 100 constructed according to the principles of the present invention.

As shown in particular in FIG. 3, the hunting stand 100 further includes a frame 10 consisting of a plurality of longitudinal support members 15. The longitudinal support members 15 are generally rod-shaped and manufactured from a suitable durable material such as but not limited to metal. The longitudinal support members 15 have a first end 16 and second end 17. The first ends 16 of the longitudinal support members 15 are superposed the ground when the hunting stand 100 has been erected. While no particular length for the longitudinal support members 15 are required, good results have been achieved utilizing longitudinal support members 15 that are approximately fifteen feet in length. While not specifically illustrated herein, it is further contemplated within the scope of the present invention that the longitudinal support members 15 are constructed from a plurality of segments in order to facilitate easier transportation thereof. Additionally, it is further contemplated within the scope of the present invention that the longitudinal support members 15 could be manufactured such that they are telescoping. While in the preferred embodiment, the hunting stand 100 utilizes four longitudinal support members 15, it should be recognized by those skilled in the art the as few as three longitudinal support members 15 could be utilized to support the platform 20.

Intermediate longitudinal support members 12,13 and generally perpendicular thereto are a plurality of lateral support members 5. The lateral support members 5 are constructed of a suitable durable material such as but not limited to metal. The lateral support members 5 are generally tubular in shape and are smaller in diameter than the longitudinal support members 15. The lateral support members 5 provide structure for a user to ascend to the platform 20 once the hunting stand 100 has been positioned in a desired location. Those skilled in the art will recognize that numerous quantities of lateral support members 5 cold be utilized.

A platform 20 is superposed the second ends 17 of the longitudinal support members 15 and is secured thereto utilizing conventional mechanical fasteners. The platform 20 is generally square in shape and is manufactured from a durable suitable material such as but not limited to metal. The platform is constructed from a first segment 25 and a second segment 27. The first segment 25 and second segment 27 are approximately equal in size and are joined at border 28. The platform 20 is manufactured in a first segment 25 and second segment 27 so as to facilitate easier transportation thereof. While the platform 20 is shown in the preferred embodiment herein as being manufactured having a first segment 25 and a second segment 27, it is further contemplated within the scope of the present invention that the platform 20 could be manufactured utilizing more than two segments so as to facilitate easier transportation of the platform 20. The platform 20 further includes a centrally located hole 19. The hole 19 is of suitable size so as to allow the platform 20 to be mounted around an exemplary tree 99 as shown in particular in FIG. 3. It is contemplated within the scope of the present invention that the platform 20 could be manufactured either with or without the hole 19.

Integrally formed with the platform 20 is a channel 30. The channel 30 further includes slot 29 is generally annular in shape and is of a size such that the channel 30 extends around the platform 20 such that the channel 30 is proximate the perimeter 24 of the platform 20. The channel 30 is a continuous structure having an interior void 31 operable to accommodate the base 40 therein. The base 40 is movably mounted within the channel 30 and is releasably secured therein by the upper members 33, 34. Upper members 33, 34 are contiguously formed with the upper surface 21 of the platform 20. The base 40 is constructed from a suitable durable material such as but not limited to metal. The base 40 includes a first end 41 and a second end 42. The base 40 includes axle 45 journaled therethrough, which is rotatably mounted having wheels 47,48 and opposing ends of the axle 45. The wheels 47,48 are superposed members 53,54 respectively. While not particularly illustrated herein, the base 40 has a second axle and two additional wheels proximate end 41. The wheels 47,48 facilitate the traversal of the base 40 along the channel 30. It is contemplated within the scope of the present invention that the movement of the base 40 could be controlled either by manual force wherein a user provides a lateral force thereto causing the base 40 to traverse along the channel 30 or a motor such as but not limited to an electric motor could be provided to control the movement of the base 40 within the channel 30. While a preferred embodiment of a base 40 has been disclosed herein, it is further contemplated within the scope of the present invention that the base 40 could utilize alternative structures so as to facilitate traversal along the channel 30. More specifically but not by way of limitation, the base 40 and channel 30 could have mateable pinion gears constructed to facilitate the movement of the base 40 along the channel 30.

Journaled through upper member 34 of the channel 30 are a plurality of apertures 60. The apertures 60 are journaled through the upper member 34 so as to allow the locking pin 70 to engage the base 40. The locking pin 40 functions to releasably secure the base 40 in a fixed position. As illustrated herein, the platform 20 includes a plurality of apertures 60 providing numerous locations completely around the entire channel 30 for the base 40 to be releasably secured. The locking pin 70 is constructed of a suitable durable material such as but not limited to metal. The locking pin 70 includes handle 71 having aperture 72 designed to facilitate easier grasping of the locking pin 70. While only one locking pin 70 is illustrated herein, it is contemplated within the scope of the present invention that more than one locking pin 70 could be utilized to releasably secure the base 40 in a fixed position within the channel 30.

Secured to the base 40 utilizing suitable methods is the chair support member 80. The chair support member 80 is generally arcuate in shape and is constructed of a suitable durable material such as metal. The chair support member 80 includes first end 81 and second end 82. Mounted to second end 82 is the seat portion 91 of chair 90. The seat portion 91 is mounted to second end 82 utilizing conventional methods such as but not limited to mechanical fasteners or welding. The seat portion 91 is manufactured utilizing conventional methods and is operable to support a user thereon. Perpendicularly mounted to the seat portion 91 is the back portion 92. The back portion 92 is mounted to the seat portion utilizing suitable durable mechanical fasteners.

Superposed the platform 20 is railing 110. The railing 110 includes four vertical posts 115 and four horizontal support members 120 operably connected to form a barrier around the perimeter 24 of the platform 20. The railing 110 is manufactured from suitable durable material such as but not limited to metal tubing. While not particularly illustrated herein, the railing 110 is operable to be disassembled utilizing conventional mechanical fasteners so as to facilitate easier transport thereof. While an exemplary railing 110 has been illustrated herein, it is contemplated within the scope of the present invention that the railing 110 could be constructed in numerous different manners so as to provide a barrier proximate the perimeter 24 of the platform 20.

Movably mounted to the horizontal support members 120 is a shield 130. The shield 130 functions to provide additional concealment for the individual that is utilizing the hunting stand 100. The shield 130 is slidably mounted to the horizontal support members 120 utilizing rings 131. The shield 130 is manufactured from a durable flexible material such as but not limited to plastic. It is contemplated within the scope of the present invention that the shield 130 has a camouflage printed surface so as to enhance the concealment of the user superposed the platform 20. While the shield 130 is illustrated herein operably coupled to only one horizontal support member 120 this is for exemplary purposes. It is contemplated within the scope of the present invention that the shield 130 is operably coupled with all four horizontal support members 130 so as to provide concealment of a user on the platform 20 from all sides thereof. While not illustrated herein, it is contemplated within the scope of the present invention that the hunting stand 100 is coated with a coating such as but not limited to paint that exhibits a camouflage pattern.

While not illustrated herein, it is contemplated within the scope of the present invention that the platform 20 could be configured with additional elements such that the hunting stand 100 could be towed by an all-terrain vehicle. More specifically but not by way of limitation, the platform 20 could have mounted thereon a pair of wheels and a shank configured to operably couple with a receiver hitch to facilitate the transportation of the hunting stand 100 is a disassembled state.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A hunting stand comprising:
    a frame said frame having at least three longitudinal support structures, said at least three longitudinal support structures having a first end and a second end, said first end of said at least three longitudinal support structures operable to engage the ground, said at least three longitudinal support structures being generally cylindrical in shape, said frame further including a plurality of horizontal support structures, said plurality of horizontal support structures being operably coupled to two of said at least three longitudinal support structures;
    a platform, said platform being superposed said at least three longitudinal support structures, said platform being generally square in shape, said platform having a perimeter edge, said platform having an upper surface and a lower surface;
    a channel, said channel being integrally formed with said platform, said channel being generally annular in shape, said channel having an interior volume defined by a bottom wall, a first side wall and a second side wall, said channel having an opening opposite said bottom wall, said channel further including a first upper support member and a second upper support member, said first upper support member and said second upper support member being contiguous with said upper surface of said platform and operable to extend inward over said opening of said channel defining a slot, said channel being proximate the perimeter edge of said platform;
    a support member, said support member operable to be disposed within said channel, said support member movably mounted within said channel, said support member operable to traverse along said channel, said support member configured to operably couple to a chair; further including an aperture, said aperture being centrally located in said platform, said aperture operable to receive a tree therethrough, and further including a chair support member, said chair support member having a first end and a second end, said first end of said chair support member being secured to said support member, said chair support member extending upward from said support member through said slot said chair support member being arcuate in shape, said chair support member extending inward towards said central aperture of said platform.

2. The hunting stand as recited in claim 1, and further including a plurality of holes, said plurality of holes being adjacent said channel, said plurality of holes being journaled through said first upper support member.

3. The hunting stand as recited in claim 2, and further including a locking pin, said locking pin configured to be releasably journaled through one of said plurality of holes, said locking pin operable to releasably secure said support member along said channel.

4. The hunting stand as recited in claim 3, and further including a railing, said railing being superposed said platform, said railing being mounted proximate said perimeter edge of said platform, said railing including a plurality of vertical support members and horizontal support members.

5. The hunting stand as recited in claim 4, and further including a shield, said shield operable to at least partially conceal a user disposed on said platform, said shield being mounted to said plurality of vertical support members of said railing.

6. A hunting stand operable to provide a user a plurality of positions so as to broaden the user's target area comprising:
    a frame said frame having a plurality of longitudinal support structures, said plurality of longitudinal support structures having a first end and a second end, said first end being superposed the ground, said plurality of longitudinal support structures being generally cylindrical in shape, said frame further including a plurality of horizontal support structures, said plurality of horizontal support structures being operably coupled to two of said plurality of longitudinal support structures, said plurality of horizontal support structures extending substantially between said first end and said second end of said plurality of longitudinal support structures;
    a platform, said platform being superposed said second ends of said plurality of longitudinal support structures, said platform having an upper surface and a lower surface, said platform including a first section and a second section, said first section and said second section being releasably secured, said platform being generally square in shape, said platform including a central aperture, said platform having a perimeter edge;
    a channel, said channel being integrally formed with said platform, said channel being formed in a continuous circle, said channel having an interior volume defined by a bottom wall, a first side wall and a second side wall, said channel having an opposite said bottom wall, said channel further including a first upper support member and a second upper support member, said first upper support member and said second upper support member being contiguous with said upper surface of said platform and operable to extend inward over said opening of said channel defining a slot;

a support member, said support member operable to be disposed within said channel, said support member movably mounted within said channel, said support member being rectangular in shape, said support member having a first side and a second side, said support member further including at least one wheel movably secured to said first side, said support member further including at least one wheel movably secured to said second side of said support member, said support member operable to traverse along said channel, said support member configured to receive a chair support member; further including a chair support member, said chair support member includes a first end and a second end, said chair support member being arcuate in shape, said chair support member extending upward and inward towards said central aperture of said platform.

7. The hunting stand as recited in claim 6, wherein said at least one wheel movably secured to said first side of said support member is adjacent said first side wall of said channel and is operable to engage said bottom wall and said first upper support member.

8. The hunting stand as recited in claim 7, and further including a plurality of apertures, said plurality of apertures being journaled through said first upper support member proximate said channel.

9. The hunting stand as recited in claim 8, and further including a locking pin, said locking pin configured to be releasably journaled through one of said plurality of apertures, said locking pin operable to releasably secure said support member in a position along said channel.

10. The hunting stand as recited in claim 9, wherein said at least one wheel movably secured to said second side of said support member is adjacent said second side wall of said channel and is operable to engage said bottom wall and said second upper support member.

11. The hunting stand as recited in claim 10, and further including a railing, said railing being mounted proximate said perimeter edge of said platform, said railing further having coupled to at least a portion thereof a shield, said shield operable to at least partially conceal a user disposed on said platform.

12. A hunting stand configured to provide an elevated support for hunter wherein the hunting stand includes a chair that is movable in a three hundred and sixty degree manner around the hunting stand so as to broaden the area in which a user can view comprising:

a frame said frame having four longitudinal support structures, said four longitudinal support structures having a first end and a second end, said first end being superposed the ground, said four longitudinal support structures being generally cylindrical in shape, said frame further including a plurality of horizontal support structures, said plurality of horizontal support structures being operably coupled to two of said for longitudinal support structures, said plurality of horizontal support structures extending substantially between said first end and said second end of said plurality of longitudinal support structures;

a platform, said platform being superposed said second ends of said four longitudinal support structures, said platform having an upper surface, said platform including a first section and a second section, said first section and said second section being releasably secured, said first section and said second section being approximately equal in size, said platform being generally square in shape, said platform having a central aperture operable to surroundably mount a tree, said platform having a perimeter edge;

a channel, said channel being integrally formed with said platform, said channel being formed in a continuous circle, said channel having an interior volume defined by a bottom wall, a first side wall and a second side wall, said channel having an opening opposite said bottom wall, said channel further including a first upper support member and a second upper support member, said first upper support member and said second upper support member being contiguous with said upper surface of said platform and operable to extend inward over said opening of said channel defining a slot, said slot being centrally located over said opening of said channel, said first support member further including a plurality of holes drilled therethrough, said plurality of holes being adjacent said slot extending the length of said channel;

a support member, said support member being generally rectangular in shape, said support member having a first end and a second end, said support member having a first side and a second side, said support member having a first axle and a second axle rotatably mounted extending across said first side and said second side, said first axle and said second axle being proximate said first end and said second end respectively, said support member further including opposedly mounted wheels mounted to opposite ends of first axle and said second axle, said support member operable to be disposed within said interior volume of said channel, said opposedly mounted wheels on said first axle operable to engage said bottom of said channel and said first upper support member, said opposedly mounted wheels on said second axle operable to engage said bottom of said channel and said second upper support member, said support member movably mounted within said channel, said support member operably coupled to the chair, said support member operable to traverse along said channel utilizing said wheels facilitating the movement of the chair in a circular manner completely around said platform, and further including a chair support member includes a first end and a second end, said chair support member being arcuate in shape, said chair support member extending upward and inward towards said central aperture of said platform, said chair support member configured so as to maintain the orientation of the chair such that the chair is facing away from said central aperture of said platform.

13. The hunting stand as recited in claim 12, and further including a locking pin, said locking pin configured to be releasably journaled through one of said plurality of holes, said locking pin operable to releasably secure said support member in a position along said channel.

14. The hunting stand as recited in claim 13, and further including a railing, said railing being superposed said platform, said railing being mounted proximate said perimeter edge of said platform, said railing including a plurality of vertical support members and horizontal support members.

15. The hunting stand as recited in claim 14, and further including a shield, said shield operable to at least partially conceal a user disposed on said platform, said shield being slidably mounted to said plurality of vertical support members of said railing, said shield having a camouflage pattern.

* * * * *